United States Patent [19]

Szyms et al.

[11] Patent Number: 5,062,781
[45] Date of Patent: * Nov. 5, 1991

[54] REINFORCED TIRE CURING BLADDER

[75] Inventors: Walter Szyms, Trumbull; Joseph W. Valaitis, Guilford, both of Conn.

[73] Assignee: Firelli Armstrong Tire Corporation, New Haven, Conn.

[*] Notice: The portion of the term of this patent subsequent to Oct. 31, 2006 has been disclaimed.

[21] Appl. No.: 390,627

[22] Filed: Aug. 7, 1989

Related U.S. Application Data

[63] Continuation-in-part of Ser. No. 230,735, Aug. 10, 1988, Pat. No. 4,877,469.

[51] Int. Cl.$^5$ .............................................. B29C 35/00
[52] U.S. Cl. ..................................... 425/52; 156/416; 425/812
[58] Field of Search ............... 156/120, 121, 123, 133, 156/172, 416, 117, 178; 264/315, 326, 501; 249/65, 179; 425/42, 43, 44, 45, 52, 53, 389, 390, DIG. 14, 33, 812, 38; 92/93, 103 F

[56] References Cited

U.S. PATENT DOCUMENTS

| | | | |
|---|---|---|---|
| 1,286107 | 11/1918 | Renner | 156/416 |
| 1,378,172 | 5/1921 | Gostlin | 425/51 |
| 1,535,647 | 4/1925 | Brennan | 156/175 |
| 1,544,217 | 6/1925 | Castricum | 156/178 |
| 1,607,356 | 11/1926 | McMahan | 425/52 |
| 1,612,024 | 12/1926 | Jacobs | 474/262 |
| 1,910,128 | 5/1933 | Semler | 425/50 |
| 2,305,412 | 12/1942 | Frolich et al. | 18/45 |
| 2,476,831 | 7/1949 | Spencer | 425/43 |
| 2,582,715 | 1/1952 | Murray | 18/45 |
| 2,650,642 | 9/1953 | Reheiser | 156/87 |
| 2,678,468 | 5/1954 | Smith | 425/53 |
| 2,728,105 | 12/1955 | Pacciarini | 425/43 |
| 2,790,205 | 4/1957 | Parker | 425/52 |
| 2,880,454 | 4/1959 | Brundage | 425/33 |
| 2,880,459 | 4/1959 | Weigold et al. | 425/43 |
| 3,101,289 | 8/1963 | Giletta et al. | 156/133 |
| 3,144,374 | 8/1964 | Saint Paul | 156/416 |
| 3,260,782 | 7/1966 | Soderguist | 425/38 |
| 3,453,900 | 7/1969 | Orndorff et al. | 474/260 |
| 3,496,783 | 2/1970 | Gorbin | 474/260 |
| 3,502,525 | 3/1970 | Wood | 156/416 |
| 3,547,734 | 12/1970 | Read | 156/416 |
| 3,713,932 | 1/1973 | Betzow et al. | 156/192 |
| 3,843,292 | 10/1974 | Kitamoto et al. | 425/43 |
| 3,911,755 | 10/1975 | Vance | 474/262 |
| 3,922,188 | 11/1975 | Appleby | 156/416 |
| 3,932,088 | 1/1976 | Harada et al. | 425/52 |
| 3,963,394 | 6/1976 | Shichman et al. | 425/51 |
| 3,979,249 | 9/1976 | Nicholls et al. | 156/416 |
| 3,990,249 | 11/1976 | Schmit | 156/123 |
| 4,030,863 | 6/1977 | MacMillan | 425/17 |
| 4,249,979 | 2/1981 | Burley | 156/412 |
| 4,381,331 | 4/1983 | Johnson | 156/154 |
| 4,531,902 | 7/1985 | Stuhldreher et al. | 425/812 |
| 4,783,230 | 11/1988 | Perkins | 156/117 |
| 4,877,469 | 10/1989 | Szyms et al. | 156/416 |
| 4,952,259 | 8/1990 | Debroche et al. | 156/117 |

FOREIGN PATENT DOCUMENTS

| | | | |
|---|---|---|---|
| 0226552 | 8/1958 | Australia | 92/103 F |
| 2156055 | 5/1973 | Fed. Rep. of Germany | 425/51 |
| 0041529 | 2/1986 | Japan | 156/172 |

Primary Examiner—Michael W. Ball
Assistant Examiner—Steven D. Maki
Attorney, Agent, or Firm—St. Onge Steward Johnston & Reens

[57] ABSTRACT

A thin, membrane-like cylindrical rubber tire curing bladder is provided with reinforcing cords wound in parallel spiral paths at any composite angle to the longitudinal axis of the cylinder. When installed on the centerpost mechanism of a tire curing press and inflated in the curing process, the bladder length increases due to partial and reversible straightening of the spirally wound cord reinforcement. This permits optimum fit of the bladder in the tire being processed with uniform controlled growth of the membrane providing improved cured tire uniformity. Longer service life of the bladder is thereby achieved. The bladder is a good heat conductor inherent to its thin matrix, unlike previously known bladders. The bladder of the present invention also provides for a unique venting mechanism during the curing process to provide a tire having reduced potential for trapped air related anomalies.

11 Claims, 4 Drawing Sheets

REINFORCED TIRE CURING BLADDER

This application is a continuation-in-part of Application Ser. No. 07/230,735 entitled "REINFORCED TIRE CURING BLADDER AND METHOD FOR USING SAME" filed Aug. 10, 1988 now U.S. Pat. No. 4,877,469.

BACKGROUND OF THE INVENTION

1. Field of the Invention

This invention relates to tire curing bladders and is more particularly concerned with an improved tire curing bladder, a method for curing tires utilizing said bladder, and an improved tire manufactured utilizing said bladder.

2. Description of the Prior Art

It is well-known in the art to shape and cure tire carcasses in a mold using a bladder that contains the internal curing heat medium and pressure within the carcass to hold the exterior of the latter in contact with the mold during the curing process.

Gostlin U.S. Pat. No. 1,378,172 shows an early and primitive bladder curing process in which the exterior of the carcass was not confined within a mold. In this method the carcass and the inner bladder (which resembles a conventional inner tube) are placed on a sectional base ring having annular shoulders to hold the bead portions of the carcass in place and having a central annular groove adapted to receive the inner edge of the bladder accurately centered in place. The bladder is inflated to round out the carcass and maintain it under proper tension while being cured. This method lacks the precision and reproducibility of the configurations now demanded of tires to be employed under present conditions as well as requiring an economically unacceptable amount of time and labor to cure the tire carcass.

Semler U.S. Pat. No. 1,910,128 describes the use of an air bladder or inner tube which has incorporated therein a heating element to apply heat to the inside of a tire carcass while the latter, encased in a mold, is being cured in a steam kettle.

Frolich et al. U.S. Pat. No. 2,305,412 describes the use of a fabric reinforced air bag resembling an inner tube which is inflated within a tire carcass during the curing process.

Saint Paul U.S. Pat. No. 3,144,374 teaches the use of a cylindrical membrane reinforced with spring steel wires and adapted to be stretched between the flanges of the drum of a tire building machine. The membrane can be deformed to a toroidal shape for constructing uncured tire carcasses. The membrane has limited extensibility in the axial direction of the cylinder due to the limited extensibility of the metal wire reinforcement. In one embodiment the reinforcement comprises a plurality of undulating wires i.e. wires having a sine wave configuration. The membrane is not designed for use in a curing process.

Read U.S. Pat. No. 3,547,734 describes a tire building (as opposed to tire curing) air bag fabricated from multiple layers of rubber which have sandwiched therein a reinforcing layer of cords forming a latticework pattern with cords aligned in one direction overlapping cords aligned in a different direction, the angle at which the layers of cord cross each other being as much as 45°.

Schichman et al. U.S. Pat. No. 3,963,394 teaches an expandable bladder for shaping radial ply uncured tire carcasses which has a relatively thick center section and a multiplicity of thinner convolutions. This design provides controlled amounts of extensibility axially. Reinforcing material which can be aramid or steel cords is provided through the center section and end sections of the bladder.

Nicholls et al. U.S. Pat. No. 3,979,249 describes an inflatable air bag for tire building machines which has inextensible reinforcing elements, comprising steel, glass fiber and like cords, in part of the width thereof to limit the expansion of the bag in the reinforced areas thereby controlling the shape which the bag assumes upon inflation.

Schmidt U.S. Pat. No. 3,990,930 shows a bladder for use with a tire building drum. The bladder is prepared by first forming a partially cured membrane reinforced with parallel cords running axially. The central portion of the membrane is expanded and has a circumferentially extending belt, optionally reinforced with lattice type material.

Macmillan U.S. Pat. No. 4,030,863 is concerned with providing a separate venting retainer for a cylindrical tire curing bladder. The retainer comprises a net-like cylinder which surrounds the exterior of the bladder and permits escape of air trapped between the inner surface of the tire carcass and the exterior surface of the expanded bladder during the curing operation.

Burley U.S. Pat. No. 4,249,979 describes a fabric reinforced inflatable bladder provided with a ply-folding wedge on its surface and adapted to fold the edges of unvulcanized rubberized ply material around bead wire bundles and the like in the process of building a tire.

We have now found that a tire curing membrane having significantly improved construction and properties can be obtained by providing a membrane with a particular type and configuration of reinforcement not hitherto taught or suggested by any of the prior art discussed above.

SUMMARY OF THE INVENTION

An improved tire curing bladder is provided comprising a hollow, tubular membrane member formable to have a circular circumference and thereby correspond to a generally cylindrical surface extending along a cylinder axis. The tubular membrane member has included therein a plurality of parallel cord lengths, each length traversing a spiral path from one end to an opposing end of said tubular membrane member at an angle of inclination with respect to said cylinder axis. When the bladder is inflated, the cord lengths tend towards parallel alignment with said axis with a lesser angle of inclination as said chamber is inflated.

The bladder of the present invention can also be used in a tire curing process to achieve a unique venting mechanism by using the cord embodied within the bladder structure. As the bladder inflates to shape an uncured tire, the cords protrude onto the bladder-carcass interface surface. Thus, the reciprocal shallow areas between these cords create channels for venting any possible trapped air to the atmosphere along the cord paths.

It is an object of the invention to provide a tire curing bladder having controlled and uniform stretch characteristics.

It is a further object of the invention to provide a tire curing bladder that gives optimum fit in the tire carcass to be cured while undergoing an exact minimal stretch.

It is yet another object of the invention to provide a tire curing bladder that has improved service life and heat transfer.

It is a further object of the invention to provide an improved tire cured using the bladder of the present invention.

These objects, and other objects which will become apparent from the description which follows, are achieved by the tire curing bladder of the invention. The latter, in its broadest aspect, comprises a cylindrical membrane of rubber having embedded therein a layer or layers of reinforcing material. The reinforcing material comprises a plurality of cords of polymeric material traversing parallel spiral paths within the cylinder of rubber.

DETAILED DESCRIPTION OF THE INVENTION

Figure 1:
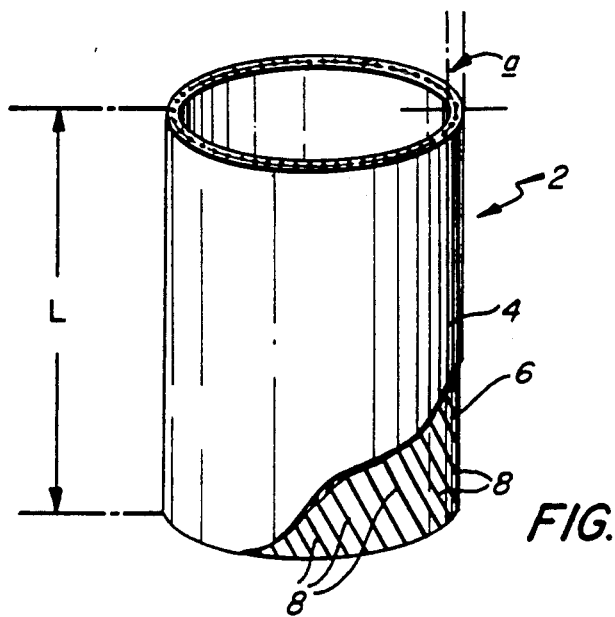
FIG. 1 is a side elevational perspective view, partially cut away, of an embodiment of a tire curing membrane or bladder in accordance with the invention.

The invention will now be described with reference to the embodiments shown in the accompanying drawings. A tire curing bladder in accordance with the invention is shown broadly as 2 in partial cutaway in FIG. 1 in a substantially uninflated condition. The bladder 2 is an open cylinder comprising outer and inner layers 4 and 6, respectively, of rubber sheet between which are sandwiched a plurality of reinforcing cords 8. The latter are disposed in parallel relationship and each follows a spiral path as illustrated. Advantageously the path followed by cords 8 in the substantially uninflated condition of FIG. 1 is inclined at an angle of about 0° to about 60° with respect to the longitudinal axis of the bladder 2. Preferably the angle of inclination of the cords with respect to said axis is in the range of about 20° to about 45°. The number of cords per inch of the circumference of the bladder 2 is advantageously of the order of about 2 to about 50 and preferably is of the order of about 10 to about 32. The angle of inclination in the uninflated condition is preferably constant from one end to the other of bladder 2.

The thickness a of the wall of the membrane bladder 2 in the substantially uninflated condition is advantageously of the order of about 0.075 inches to about 0.4 inches and preferably of the order of about 0.09 to about 0.12 inches. The thickness chosen in any given instance is a function of the size of tire carcass to be cured.

The cords 8 can be of any of a variety of materials such as steel wire, glass fiber, polymeric materials such as polyamides, polyimides and the like, which are substantially inextensible. Advantageously the cords 8 are of a denier of the order of about 400 to about 3500 and are composed of polymeric fibers. In a preferred embodiment of the invention the cords 8 are composed of aramid fibers of which those available under the trademarks "Fiber B" and "Kevlar" are typical. Aramid is a generic name for the condensation product of isophthalic or terephthalic acid and m- or p- phenylene diamine.

The length L of the bladder 2 is so chosen to provide an appropriate contact surface area equal to or slightly less than that of the inside cross-sectional periphery of the tire which is to be cured, as will be discussed in more detail below.

Figure 2:
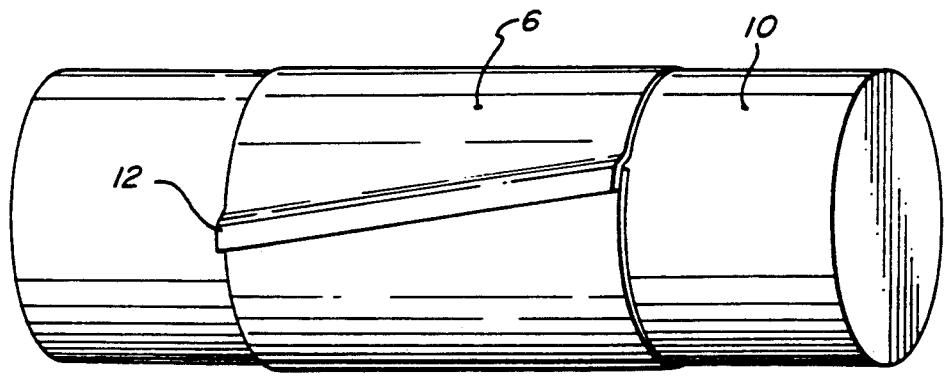
FIG. 2 is a perspective view showing a first stage in the preparation of a curing membrane or bladder in accordance with the invention.
Figure 3:
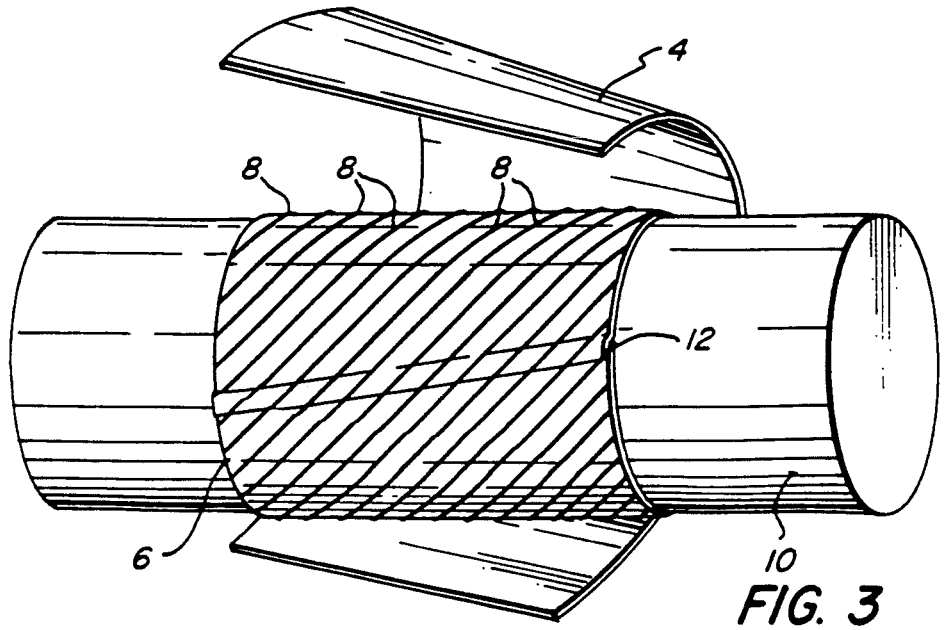
FIG. 3 is a perspective view showing a second stage in the preparation of a curing membrane or bladder in accordance with the invention.

The method of fabricating a reinforced tire membrane bladder in accordance with the invention is illustrated in FIGS. 2 and 3. In the first step of the process a rubber layer 6 is assembled on a forming drum 10. The rubber employed in layer 6 advantageously is butyl rubber. The two ends of the layer are overlapped slightly as shown at 12 to form a seam. In the second step of the method, the reinforcing cords 8 are assembled in parallel spiral paths over the entire length of the layer 6. Optionally the cords 8 have been coated previously with rubber or like bonding agents to ensure satisfactory adhesion of the reinforcing material, in the ultimate curing step, to the layer 6 and a second layer 4 which is to be assembled in the next step. Advantageously the cords 8 are calendered on to the layer or layers 6 using conventional calendering means and techniques. The cords 8 are aligned in paths which form an angle of inclination with respect to the longitudinal axis of the forming drum 10 as discussed above.

A second rubber layer 4 which also is advantageously butyl rubber is then assembled over the cords 8 and layer 6. The ends of the second layer overlap slightly to form a seam in the same manner as shown and described for layer 6. The location of the same is so chosen that it does not coincide with the seam 12 on layer 6. Preferably the two seams are located in diametrically opposed positions in the finished tire bladder or membrane.

The final step of the process comprises curing the tire bladder assembly using conventional procedures such as heat, time and pressure.

Figure 4:
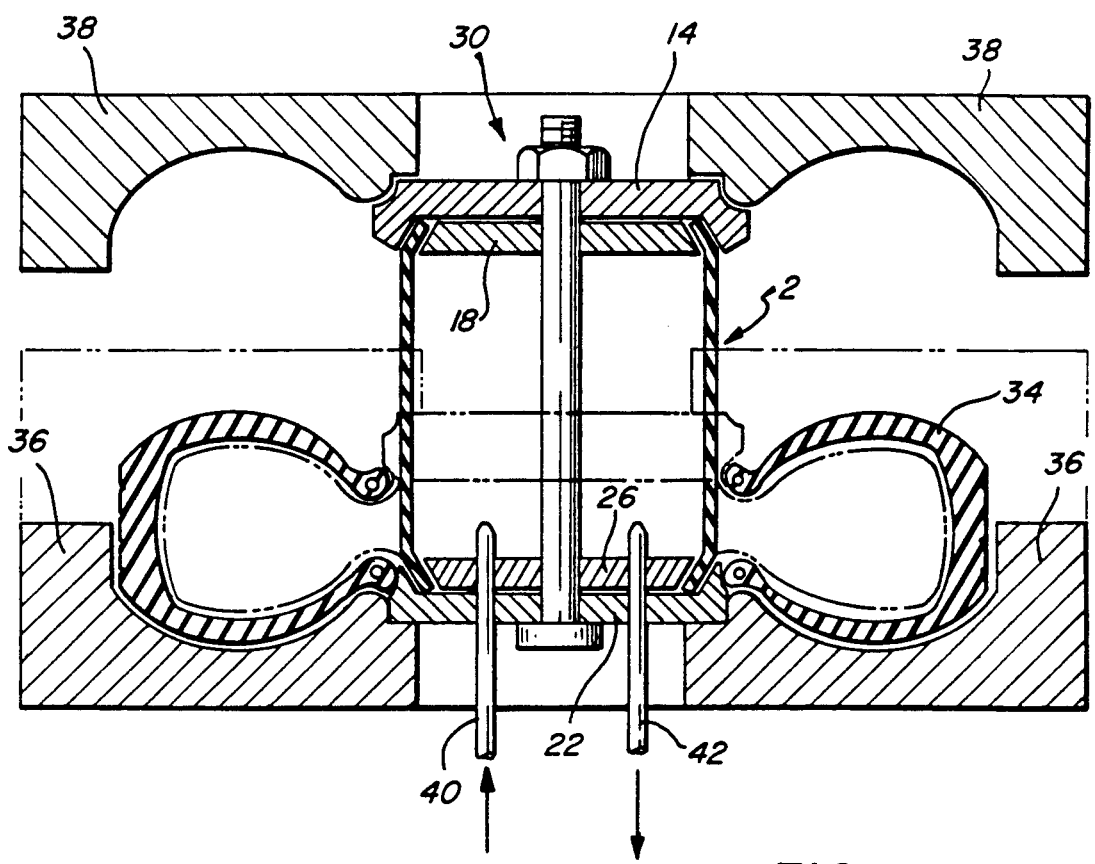
FIG. 4 is a cross-sectional view of a curing membrane or bladder in accordance with the invention installed in a tire curing apparatus.
Figure 5:
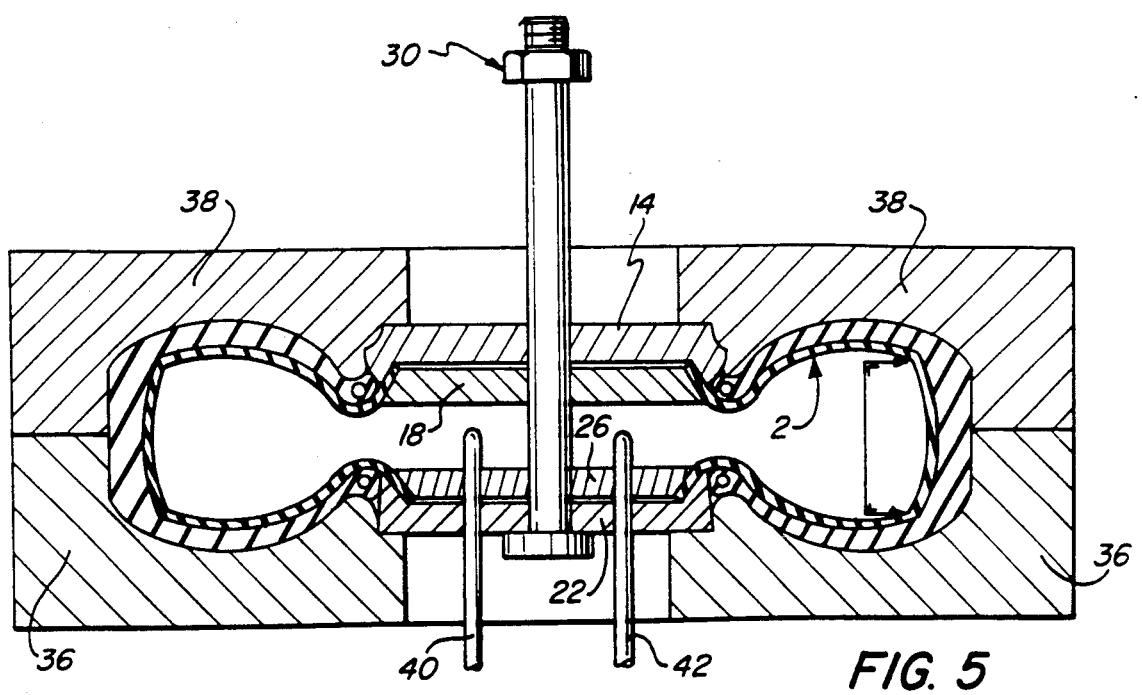
FIG. 5 is a cross-sectional view of a bladder in accordance with the present invention installed in a tire curing apparatus during the curing process.

FIG. 4 shows the tire membrane bladder 2 in accordance with the invention mounted on the centerpost assembly of a conventional automatic tire curing apparatus. One end of the membrane bladder 2 is secured around its periphery between the outer locking flange 14 and the cooperating inner flange 18. The other end of tire membrane or bladder 2 is secured in similar manner around its periphery between the outer flange 22 and the inner cooperating flange 26. Both cooperating pairs of flanges are held securely together by fastening means such as nuts and bolts (not shown). The flange 14 and cooperating flange 18 can be moved downwardly to the position shown in dotted lines by operating the automatic press or centerpost 30. As the flange 14/18 assembly is lowered in this manner the walls of the membrane or bladder 2 gradually assume the toroidal cross-sectional profile as internal pressure is introduced as shown in dotted lines in the final downward position of the flange 14/18 assembly. The membrane bladder is thereby disposed within the interior of uncured tire carcass 34 which is held between the two halves 36 and 38 of a tire mold. the upper half 38 of the mold is brought into cooperation with the lower half 36 at the same time as the flange 14/18 assembly is lowered into the position shown in dotted lines or subsequently thereto. FIG. 5 shows the same structure as FIG. 4, but with the curing apparatus in a closed position for curing.

The membrane bladder 2, when it has assumed the configuration shown in dotted lines, is in contact with the inner wall of the tire carcass 34. When the mold halves 36 and 38 have been brought together and secured in place, the tire bladder 2 is inflated, using steam and like fluids through inlet nozzle 40, so as to make contact with the inner wall of the tire carcass over all the abutting surfaces of the two members. The pressure thus exerted on the inner wall of the carcass serves to hold the outer surface of the latter in intimate contact with the inner wall of the mold. The tire carcass 34, having been encapsulated in the above manner in the mold and secured therein by inflation of membrane bladder 2 is then cured by application of heat to, and through, the mold. One of the advantages of the membrane bladder 2 of the invention is that, because of its thin walls, it is a very satisfactory conductor of heat. Internal heat can thereby be transmitted to the carcass 34 by introducing steam or other heat medium via inlet nozzle 40 with controlled venting through exit nozzle 42.

Figure 7:
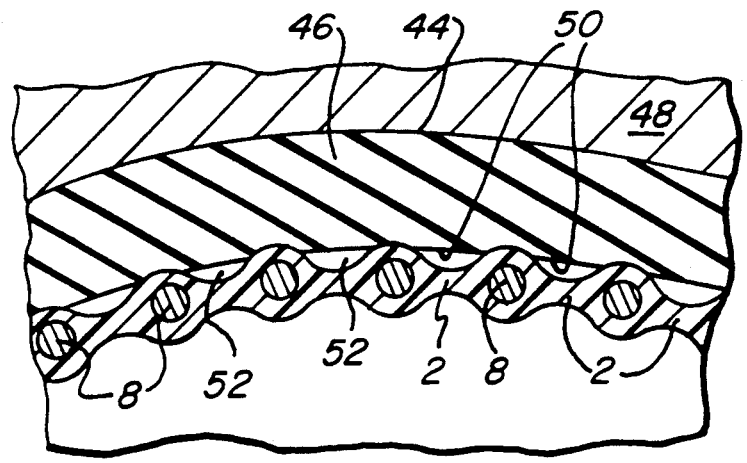
FIG. 7 is a cross-sectional view of an inflated bladder in relationship to the tire carcass during the venting process.
Figure 8:
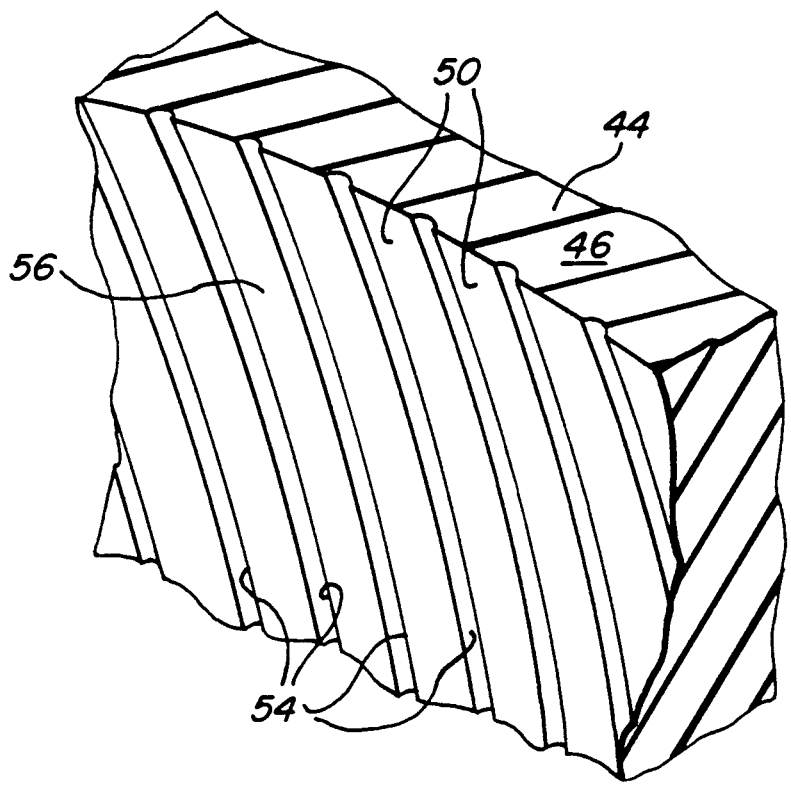
FIG. 8 is a cross-sectional view of a portion of the inner wall of a tire carcass made using the bladder of the present invention.

Another advantage of using the bladder 2 of the present invention relates to a unique venting process accomplished by using the cord within the structure of bladder 2. As bladder 2 inflates to shape an uncured tire 44 having a carcass 46 and tread region 48, the cords 8 protrude onto the bladder-carcass interface 50 as shown in FIGS. 7 and 8. The reciprocal shallow areas 52 between cords 8 as shown in FIG. 7 create a matrix for venting any possible trapped air to the atmosphere along the established cord paths or areas 52. A tire made using this bladder 2 as illustrated in FIG. 8 has a series of slight channels 54 matching the imprint of the cords 8 formed during the curing process. The tire formed using the bladder 2 has reduced potential for anomalies related to trapped air at the inside surface 56 because of the improved venting characteristics as described above.

A further advantage of the membrane bladder 2 is that inflation thereof in the curing step tends to cause the spirally wound reinforcing cords 8 (see FIG. 1) to straighten out and assume or seek to assume a configuration that parallels the longitudinal axis of the bladder. This re-orientation of the reinforcing cords permits the side wall of the membrane bladder to be extended by a limited, controlled amount and rotate in a screw like manner into relatively close engagement with said tire carcass. The cooperating pairs of flanges or enclosing means are preferably rotatable in opposing directions about the bladder or cylinder axis as cords 8 tend towards the lesser angle in response to inflation of the bladder or chamber. In general the amount by which the bladder can be extended in this manner depends upon the particular initial configuration and angle of the spirally wound reinforcing cords. Because the amount of extension is controlled in this manner it is possible to choose the appropriate length L (see FIG. 1) of the membrane bladder which is to be used in the curing of any given size tire interior periphery. Thus, in general the desirable length L of the membrane bladder provides an appropriate contact surface area that may be equal to or less than the inside cross-sectional periphery of the tire in its cured configuration. In a preferred embodiment which has been found to give optimum results the length L of the membrane bladder has a specific dimension, depending on the particular orientation of reinforcing cords, in which the contact surface equals or is less than the inside cross-sectional peripheral dimension of the cured tire. However, other values of length L can generate a contact surface area ranging from a length equal to that of the inside peripheral dimension of the tire to a length substantially less than said dimension, if desired. Thus the length of curing membrane bladder used in any given instance can be tailored to fit the particular size of tire being cured.

Figure 6:
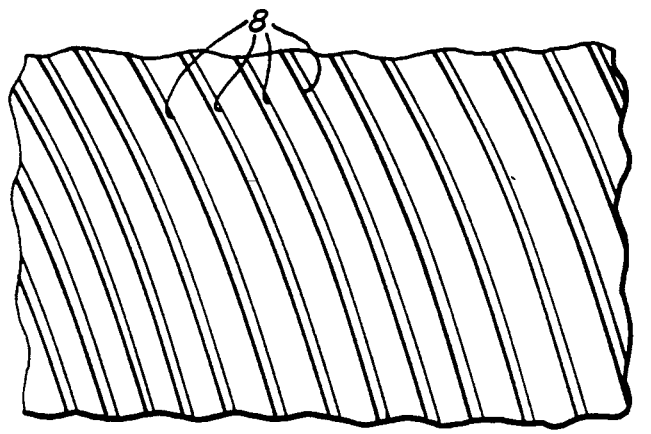
FIGS. 6 and 6A are cross-sectional views of a bladder in accordance with the present invention before and after substantial inflation, respectively.
Figure 6A:
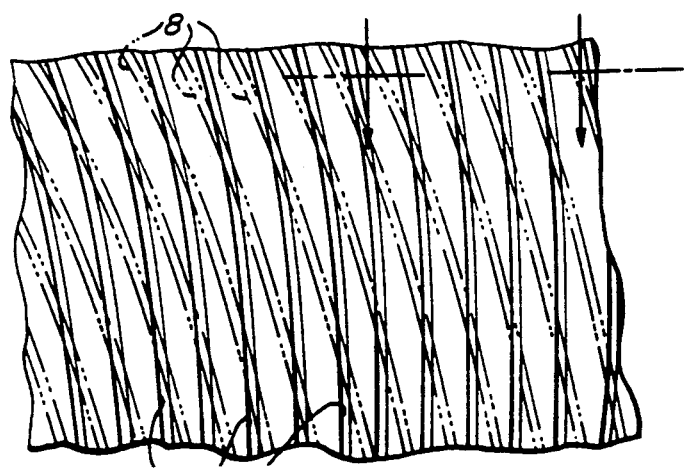

FIG. 6 shows the cords 8 before substantial inflation, while FIG. 6A shows both the cords 8 and the cords 8' before and after substantial inflation respectively.

Another advantage of the bladder 2 of the present invention is that tires cured using bladder 2 as opposed to the prior art bladders demonstrate much improved roundness and uniformity. For example, an inflated membrane bladder 2 having a run out of on the order of 0.080 inches has been achieved, whereas using an equivalent size bladder of the prior art can have an inflated runout of about 0.982 inches.

In a particular embodiment of the invention, an extended length of reinforced cylindrical curing membrane bladder prepared in accordance with the invention is provided from which appropriate lengths can be cut for use in curing any given size of tire carcass. Further, the nature and particular configuration of the reinforcing cords 8 employed in the curing membrane bladders of the invention serve to ensure that the configuration of the bladder assumed upon inflation thereof is uniform and does not change even after repeated use. It is found that the average working life of a curing membrane bladder in accordance with the invention is significantly greater than that of bladders previously employed whether these be unreinforced or reinforced with knitted fabric and like types of reinforcement previously employed in the art.

By reason of the increased heat conductivity of the curing membrane bladders of the invention, which permits transmittal of heat to the tire carcass from the inside in addition to heat supplied through the tire mold, it is possible to reduce the overall time required to cure the tire carcass. The overall productivity of the given tire curing process is thereby increased.

These advantages, and other advantages which will be apparent to one skilled in the art, are clearly beneficial and enable the process of curing tire carcasses to be carried out with a marked increase in productivity coupled with reduced complexity of equipment required in the curing process without sacrifice of quality and accuracy of configuration of the tires so cured.

While the invention has been described with reference to certain specific embodiments thereof it is to be understood that these have been given for purposes of illustration only and are not to be construed as limiting. Modifications which can be made thereto without departing from the scope of the invention will be readily apparent to one skilled in the art.

It is understood that, while the present invention is disclosed in terms of its use in molding new tires the present invention is likewise useful in similar operations such as retreading via hotcap methods and in the manufacture of V-belts where such bladders are employed.

What is claimed is:

1. A tire processing bladder comprising a hollow, tubular relatively thin member having a tubular circumference extending around a tubular axis, said tubular membrane member inflatable to provide a circular circumference greater than the tubular circumference, said tubular membrane member having included therein a plurality of parallel cords, each said cord traversing a spiral path from one end to an opposing end of said tubular membrane at an angle of inclination with respect to the tubular axis, the relative thinness of said tubular membrane member permitting said cords to protrude from said tubular membrane member when formed to have said circular circumference to create reciprocal shallow areas between said cord lengths and thus form a matrix for venting air trapped between said tubular membrane member and an uncured tire, the inclination angle of said cords limiting the circular circumference by limiting the amount said tubular membrane member may be inflated, said tubular membrane member rotating substantially in a screw manner upon inflation into relatively close engagement with an inside surface of said uncured tire.

2. The bladder of claim 1 wherein each said cord is spaced uniformly from every other adjacent cord around the tubular circumference.

3. The bladder of claim 2 wherein each said cord extends continuously from the one end to the opposing end of said tubular membrane member.

4. The bladder of claim 3 wherein said cords tend towards parallel alignment with said axis as said tubular membrane member is inflated.

5. The bladder of claim 3 comprising a pair of means for enclosing said opposing ends to form a relatively fluid impervious chamber for receiving a fluid under pressure, each said enclosing means operatively coupled to said cords at respective ends of said tubular membrane member, at least one of said enclosing means is rotatable about said axis upon inflation of said tubular membrane member.

6. The bladder of claim 5 wherein at least one of said enclosing means is movable along said axis toward the other, and wherein said tubular membrane member balloons upon inflation and as said enclosing means are so moved towards each other into a generally toroidal shape.

7. A tire processing bladder responsive to the introduction of fluid thereto under a range of fluid pressures for assuming a relatively uninflated state for insertion into a tire processing assembly and a relatively inflated state during tire processing carried out in said assembly, said bladder comprising a tubular shaped membrane of rubber formed along a tubular axis and having embedded therein a plurality of reinforcing cords traversing substantially parallel paths within said rubber in a generally spiral pattern about said tubular axis, and which cords as said bladder is inflated from said relatively uninflated towards said relatively inflated state by said introduction of fluid tend to become aligned away from said spiral pattern and more towards a longitudinal direction aligned with said tubular axis, said bladder forming a substantially toroid-shaped portion inside a tire being cured in said relatively inflated state inside said tire processing assembly, said substantially toroid-shaped portion tending to rotate into relatively close engagement with an inside surface of said tire being cured in response to said introduction of fluid, said cords protruding from said bladder when formed to have said substantially toroid-shaped portion to create reciprocal shallow areas between said cords and thus form a matrix for venting air trapped between said bladder and an uncured tire.

8. An improved tire bladder of claim 7, wherein the average thickness of said bladder is of the order of about 0.075 to about 0.40 inches.

9. An improved tire bladder of claim 7, wherein said reinforcing material comprises aramid cord.

10. An improved tire bladder of claim 12, wherein said aramid cord has a denier in the range of about 400 to about 3500.

11. An improved tire bladder according to claim 7 wherein said rubber is butyl rubber.

* * * * *

UNITED STATES PATENT AND TRADEMARK OFFICE
CERTIFICATE OF CORRECTION

PATENT NO. : 5,062,781

DATED : November 5, 1991

INVENTOR(S) : Szyms et al.

It is certified that error appears in the above—identified patent and that said Letters Patent is hereby corrected as shown below:

On the title page, after "[73] Assignee:"

delete "Firelli" and insert --Pirelli--.

Signed and Sealed this

Ninth Day of March, 1993

Attest:

STEPHEN G. KUNIN

Attesting Officer

Acting Commissioner of Patents and Trademarks